United States Patent [19]

Thompson et al.

[11] Patent Number: 5,218,924
[45] Date of Patent: Jun. 15, 1993

[54] MILKING SYSTEM WITH VARIABLE PRESSURE SOURCE

[75] Inventors: Paul D. Thompson, Madison; Ronald J. Pulvermacher, Cottage Grove, both of Wis.

[73] Assignee: DEC International, Inc., Madison, Wis.

[21] Appl. No.: 853,924

[22] Filed: Mar. 19, 1992

[51] Int. Cl.⁵ .............................................. A01J 5/16
[52] U.S. Cl. ............................. 119/14.02; 119/14.41; 119/14.47
[58] Field of Search ............... 119/14.02, 14.31, 14.41, 119/14.47

[56] References Cited

U.S. PATENT DOCUMENTS

| | | | |
|---|---|---|---|
| 3,172,391 | 3/1965 | Norton | 119/14.41 |
| 4,041,904 | 8/1977 | Yang | 119/14.41 |
| 4,292,926 | 10/1981 | Tilman | 119/14.02 |
| 4,530,307 | 7/1985 | Thompson | 119/14.49 |
| 4,537,152 | 8/1985 | Thompson | 119/14.54 |
| 4,570,104 | 2/1986 | Rubino | 119/14.02 |

FOREIGN PATENT DOCUMENTS

| | | | |
|---|---|---|---|
| 32752 | 7/1981 | European Pat. Off. | 119/14.02 |
| 1091885 | 5/1984 | U.S.S.R. | 119/14.41 |
| 1135467 | 1/1985 | U.S.S.R. | 119/14.02 |
| 1271461 | 11/1986 | U.S.S.R. | 119/14.41 |
| 1512533 | 10/1989 | U.S.S.R. | 119/14.41 |
| 1450169 | 9/1976 | United Kingdom | 119/14.02 |

OTHER PUBLICATIONS

Bellofram Type 1000 I/P and E/P Transducers, Bellofram, State Route 2, P.O. Box 305, Newell, W. Va. 26050.
"Monitoring the Flow of Milk within Machine Milked Teat by Observing Doppler Shift of Back-Scattered Ultrasound", P. D. Thompson et al, Transactions of the ASAE, vol. 17, No. 3, pp. 496,497,498,499 and 504, 1974
AD6948*, Analog Devices, On Technology Way, P.O. Box 9106, Norwood, Mass. 02063-9106.

Primary Examiner—John G. Weiss
Attorney, Agent, or Firm—Andrus, Sceales, Starke & Sawall

[57] ABSTRACT

A milking system uses a variable pressure source and varies the pressure supplied to the pulsation chamber along a controllably variable pressure curve of selectable waveshape. Pulsation cycles are shortened by shortening the transition time between pressure levels providing on and off portions of the pulsation cycle. The pulsation chamber is sequenced through different pressure change rates, all during the transition. Pressure transition times during pulsation cycles are varied at the beginning, middle and end of a milking interval to provide a faster rate of liner opening movement and/or larger diameter liner opening at the beginning of the milking interval to provide deeper teat penetration into the liner, an intermediate rate of liner opening movement and/or intermediate diameter liner opening during the middle of the milking interval, and a slower rate of liner opening movement and/or smaller diameter liner opening at the end of the milking interval to limit loss of adhesion between a less than full teat and the interior of the liner. The repetition rate of the waveshape may be varied to provide a plurality of pulsation cycles of variable duration, further reducing milking time. The pressure is further varied during both on portions and off portions of the pulsation cycle at a higher frequency than the repetition frequency of the pulsation cycle to stimulate milk flow.

60 Claims, 4 Drawing Sheets

MILKING SYSTEM WITH VARIABLE PRESSURE SOURCE

BACKGROUND

The invention relates to a method and apparatus for milking mammals, including cows.

Milking systems withdraw milk from the milk secreting glands of mammals by applying negative pressure (pressure below atmospheric pressure), i.e. vacuum, to the teat. A plurality of teat cups are provided, each having a liner, or inflation, around a respective teat, lo and defining a milk flow passage within the liner below the teat, and a pulsation chamber outside the liner between the liner and the teat cup. The milk flow passage within the liner supplies milk to a milking claw which also receives milk from the milk flow passages of the other liners of the other teat cups.

Simply supplying a constant vacuum to the teat is not desirable because it causes the tissue of the teat to become engorged with blood and lymph. When these fluids are confined to their normal spaces within the teat, the condition is called congestion. When the fluids leave their normal spaces, it is called oedema. These conditions may result in pain or discomfort to the mammal being milked, and swelling of the tissue which may constrict the duct through which milk is being withdrawn, thereby slowing the flow of milk. The slowing of milk flow due to the effects of congestion may be accompanied by a reduced volume of milk available for removal because the discomfort may interfere with the milk ejection reflex by which the mammal presents her milk to the teat.

Various attempts have been made to ameliorate the undesirable effects of vacuum on the teat by carefully shaping the teat cup and liner to support the teat as well as possible, and by periodically relieving the vacuum to the teat. The liner periodically collapses around and below the teat, providing massage to the teat. The massage compresses the end of the teat, thereby actively forcing fluids out of the teat apex. The massaging action of the liner also provides stimulation to the teat whereby the milk ejection reflex is strengthened. In some cases, the milk ejection reflex may be elicited solely by the action of the pulsating liner. The pulsation cycle has an on portion and an off portion. Milk is withdrawn from the teat through the liner to the claw during the on portion. During the off portion, the closed liner stops milk flow from the teat.

In the prior art, a two-way valve, or pulsator, alternates between a first condition connecting a negative pressure source, i.e. vacuum, to the pulsation chamber, and a second condition supplying atmospheric or higher pressure to the pulsation chamber. The two-way valve provides a pulsation cycle having an on portion during the first condition of the valve, and an off portion during the second condition of the valve. The valve or pulsator simply transfers the pulsation chamber connection between two alternative sources, namely vacuum and atmosphere.

In the prior art, it is known to replace the atmospheric pressure source with a source above atmospheric pressure for some part of the milking (positive pressure pulsation). It is also known to use a vacuum level other than milking vacuum to replace the vacuum source. It is also known to vary the repetition rate or ratio between atmospheric and vacuum phases of pulsation. These changes may be varied during milking, either on a fixed program or under the control of the flow of milk from the mammal. The rate of transition from atmospheric to vacuum may be changed by selecting the sizes of orifices used in the pulsator. However, the pulsator remains a two-way valve.

SUMMARY

In the present invention, the pulsator is replaced with a variable pressure source, and a controllably variable pressure is supplied to the pulsation chamber. The pressure is varied along a controllably variable pressure curve of selectable waveshape.

In one aspect of the invention, the pulsation cycle is shortened by shortening the transition time between first and second pressure levels providing on and off portions of the pulsation cycle. The shape and slope of the transition pressure waveform between the noted first and second levels is controlled along a selected pattern. In one embodiment, during the transition, the pressure is varied at sequenced rates which reduces delay in liner movement and which generate a change in internal liner volume at a maximum desired rate. This is accomplished by varying the rate of pressure change. During the transition, the pressure is maintained at one of the noted pressure levels until the liner is ready to move, and then the pressure is abruptly changed to an intermediate level to begin liner movement, and then the pressure is changed at a slower rate to complete liner movement, and then the pressure is abruptly changed to the other of the noted pressure levels, all during the transition between the on and off portions of the pulsation cycle. During the transition, pressure is initially applied to the pulsation chamber at a first rate of change, and then applied at a second rate of change which is less than the first rate of change, and then applied at a third rate of change which is greater than the second rate of change, such that during the transition, the pulsation chamber is sequenced through changing pressure rates, including from the first rate to the second rate, and from the second rate to the third rate, all during the transition between the on and off portions of the pulsation cycle.

In one embodiment, the invention enables the noted transition time to be reduced from 0.2 second to 0.05 second, and the pulsation cycle to be reduced from 0.9 second to 0.6 second, while still withdrawing the same amount of milk, i.e. the same amount of milk is withdrawn in one-third less time, or stated another way, fifty percent more milk is withdrawn in the same amount of time.

In another aspect of the invention, a milking interval is provided having a plurality of pulsation cycles, and the pressure change transition time from an upper pressure level to a lower pressure level during pulsation cycles at the end of the milking interval is lengthened to provide a decreasing-pressure transition time during pulsation cycles at the end of the milking interval which is longer than the decreasing-pressure transition time during pulsation cycles in the middle of the milking interval, to provide a slower rate of liner opening movement during pulsation cycles at the end of the milking interval than the rate of liner opening movement during pulsation cycles in the middle of the milking interval, to open the liner more slowly at the end of the milking interval than during the middle of the milking interval, to limit loss of adhesion between a less than full teat and the interior of the liner at the end of the milking interval. In a further aspect, the pressure change transition time from the upper pressure level to the lower pressure level during pulsation cycles at the beginning of the milking interval is shortened to provide a decreasing-pressure transition time during pulsation cycles at the beginning of the milking interval which is shorter than the decreasing-pressure transition time during pulsation cycles in the middle of the milking interval, to provide a faster rate of liner opening movement during pulsation cycles at the beginning of the milking interval than the rate of liner opening movement during pulsation cycles in the middle of the milking interval, to open the liner more rapidly at the beginning of the milking interval than during the middle of the milking interval, to provide deeper teat penetration into the liner and faster milking. The pressure change transition time from the upper pressure level to the lower pressure level is varied to provide a first decreasing-pressure transition time from the upper pressure level to the lower pressure level during pulsation cycles at the beginning of the milking interval, a second decreasing-pressure transition time from the upper pressure level to the lower pressure level during pulsation cycles in the middle of the milking interval, and a third decreasing-pressure transition time from the upper pressure level to the lower pressure level during pulsation cycles at the end of the milking interval, wherein the first transition time is shorter than the second transition time, and the third transition time is longer than the second transition time. The pressure applied to the pulsation chamber during on portions of the pulsation cycles is varied during the milking interval to open the liner at a first rate of liner opening movement during pulsation cycles at the beginning of the milking interval, a second rate of liner opening movement during pulsation cycles in the middle of the milking interval, and a third rate of liner opening movement during pulsation cycles at the end of the milking interval, wherein the first rate is faster than the second rate, and the third rate is slower than the second rate.

In another aspect of the invention, a milking interval is provided having a plurality of pulsation cycles, and the pressure applied to the pulsation chamber by the variable pressure source is varied during on portions of pulsation cycles at the end of the milking interval to open the liner less at the end of the milking interval than during the middle of the milking interval, to limit loss of adhesion between a less than full teat and the interior of the liner at the end of the milking interval. In a further aspect, the pressure is varied during on portions of pulsation cycles at the beginning of the milking interval to open the liner more at the beginning of the milking interval than during the middle of the milking interval, to provide deeper teat penetration into the liner and faster milking. The pressure is varied to open the liner to a first diameter at the beginning of the milking interval, and to a second diameter during the middle of the milking interval, and to a third diameter at the end of the milking interval, the first diameter being greater than the second diameter, and the second diameter being greater than the third diameter.

In another aspect of the invention, the pressure applied to the pulsation chamber during the off portion of the pulsation cycle is controllingly varied to vibrate and massage the teat during the off portion by alternately increasing and decreasing the pressure applied to the pulsation chamber during the off portion at a higher frequency than the repetition frequency of the pulsation cycle.

In another aspect of the invention, the pressure applied to the pulsation chamber during the on portion of the pulsation cycle is controllingly varied to alternately increase and decrease the pressure at a higher frequency than the repetition frequency of the pulsation cycle, to bump and vibrate the teat and further stimulate the milk ejection reflex of the mammal.

In another aspect of the invention, the length of the on portion of the pulsation cycle is changed during the milking interval to accommodate the nonsteady rate of milk flow inherently resulting from the anatomical structure of the teat, and the reduced supply from the milk secreting glands which occur as milking progresses.

BRIEF DESCRIPTION OF THE DRAWINGS

Prior Art

Present Invention

DETAILED DESCRIPTION

Prior Art

Figures 1, 2, 3:
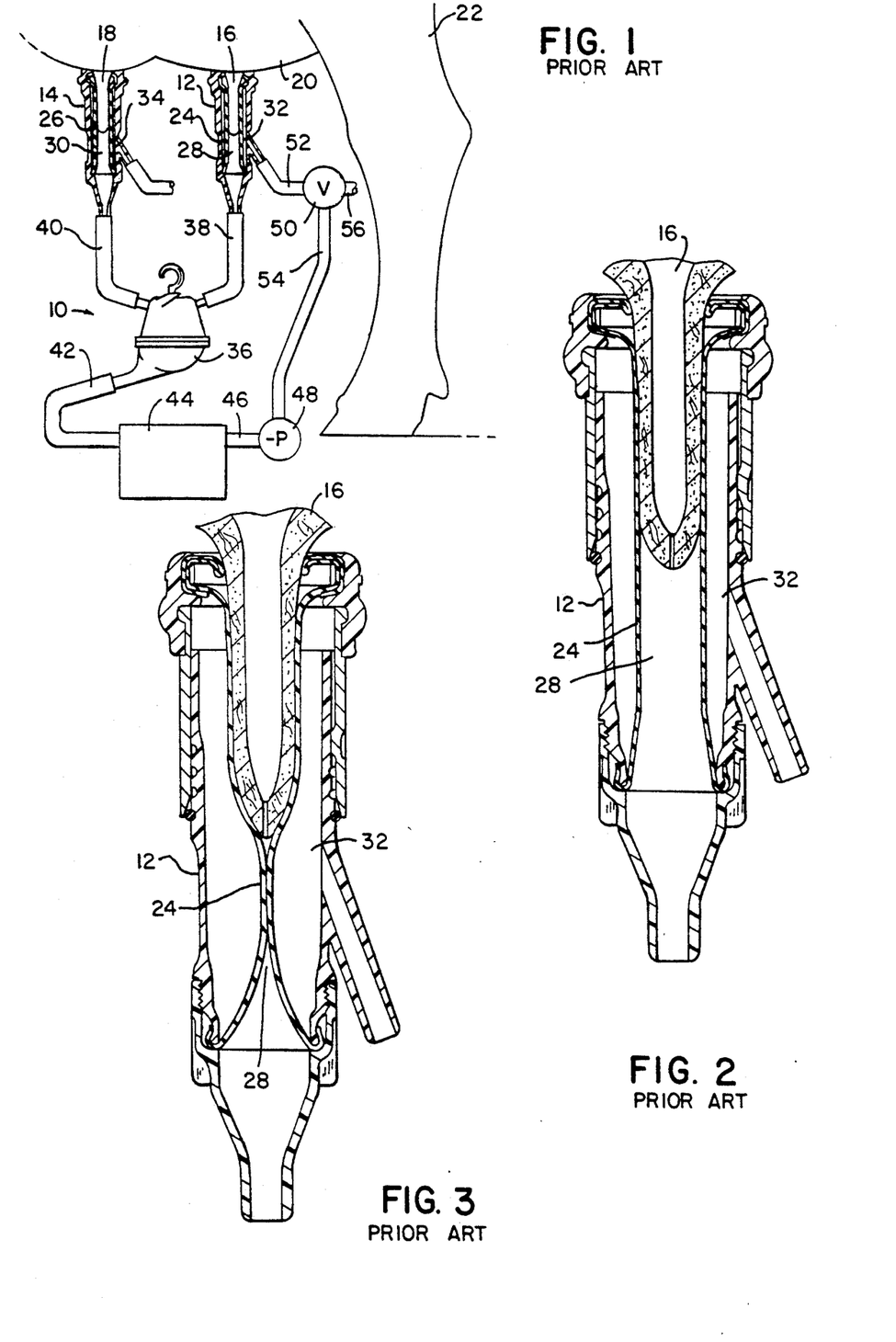
FIG. 1 schematically illustrates a milking system known in the prior art.
FIG. 2 shows a teat cup and liner during the on portion of a pulsation cycle as known in the prior art.
FIG. 3 is like FIG. 2 and illustrates the off portion of a pulsation cycle.

FIG. 1 shows a milking system 10 having a plurality of teat cups such as 12, 14 connected to respective teats such as 16, 18 depending from the udder 20 of a mammal 22 such as a cow. Each teat cup has a liner or inflation such as 24, 26 around a respective teat, and defining a milk flow passage such as 28, 30 within the liner below the teat, and a pulsation chamber such as 32, 34 outside the liner between the liner and the teat cup. The teat cup and liner are shown and described in U.S. Pat. No. 4,530,307, incorporated herein by reference. A milking claw 36, for example as shown in U.S. Pat. No. 4,537,152, incorporated herein by reference, has a plurality of inlets receiving milk through tubes such as 38, 40 connected to respective teat cups to receive milk from respective milk flow passages such as 28, 30. The claw has a discharge tube 42 connected to milk collection container 44 having a vacuum connection tube 46 connected to a source of negative pressure 48. There are a multitude of arrangements of this negative pressure source, as well known in the art. Negative pressure source 48 applies substantially constant negative pressure (vacuum), relative to atmospheric pressure, through claw 36 to milk flow passages 28, 30.

The system has a pulsation cycle with an on portion and an off portion. Milk flows from the teat towards claw 36 during the on portion. A two-way valve or pulsator 50 is connected to each of the teat cups at a connection tube such as 52 and has first and second conditions alternately and cyclicly connecting the teat cup to the negative pressure source 48 through connection tube 54 during the on portion of the pulsation cycle, and connecting the teat cup to atmosphere through connection tube 56 during the off portion of the pulsation cycle. There are a multitude of arrangements for making the connections to the pulsator, as well known in the art. It is also known in the prior art to connect the teat cup to a source of positive pressure, relative to atmospheric pressure, during the off portion of the pulsation cycle, e.g. by supplying connection tube 56 with a source of positive pressure. During the off portion of the pulsation cycle, the positive pressure or atmospheric pressure applied through connection tube 56, valve 50, and connection tube 52 to pulsation chamber 32 of teat cup 12 collapses and closes liner 24 below teat 16, FIG. 3, to block milk flow, and to relieve the teat from the negative pressure applied from source 48 through connection tube 46, container 44, connection tube 42, claw 36, and connection tube 38 to milk flow passage 28 at the lower end of liner 24. During the on portion of the pulsation cycle, negative pressure from source 48 is applied through connection tube 54, valve 50, and connection tube 52 to pulsation chamber 32 of teat cup 12, such that liner 24 opens to its normally open position, FIG. 2, and milk is withdrawn from teat 16.

Figure 4:
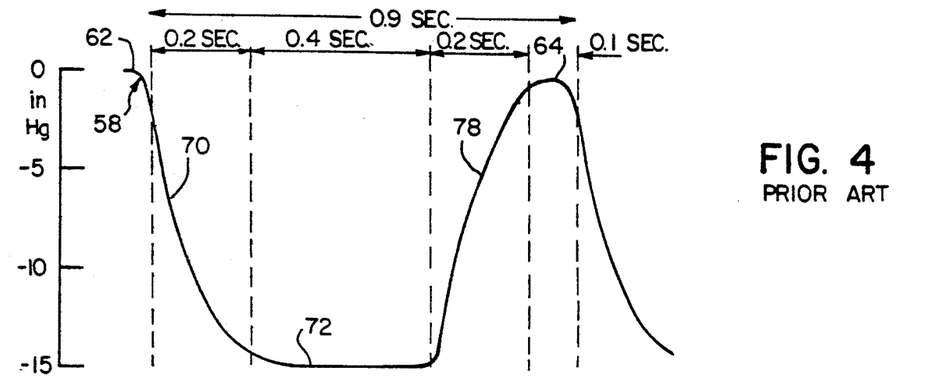
FIG. 4 is a graph showing pressure in the pulsation chamber during a pulsation cycle as known in the prior art.
Figure 5:
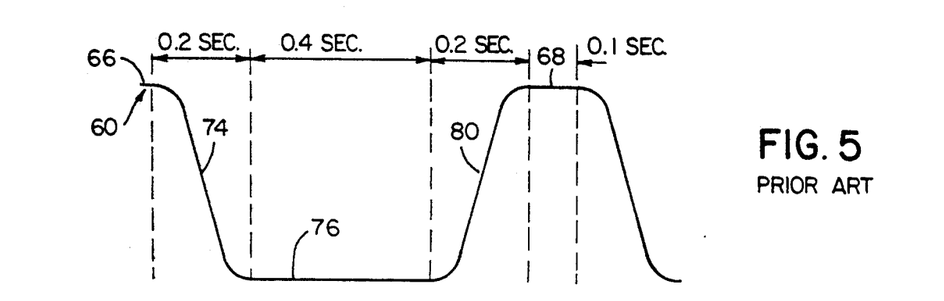
FIG. 5 shows liner movement during the pulsation cycle of FIG. 4.

In FIG. 4, the pressure in pulsation chamber 32 is shown at solid line 58. In FIG. 5, the movement of liner 24 is shown at solid line 60. The period of the pulsation cycle is about 0.9 second.

During the off portion of the pulsation cycle, the pressure in pulsation chamber 32 is at atmospheric pressure, i.e. zero relative to atmosphere, as shown at 62, FIG. 4, and again at 64, and liner 24 is in its closed position of FIG. 3 which is illustrated at 66 in FIG. 5, and again at 68. Pulsator valve 50 is switched to its alternate condition to initiate the transition from the off portion to the on portion of the pulsation cycle. Switching of valve 50 to its alternate condition connects negative pressure source 48 through connection tube 54, valve 50, and connection tube 52 to pulsation chamber 32, such that the pressure in pulsation chamber 32 falls as shown at 70, FIG. 4, to lower level 72 which is a negative pressure, relative to atmosphere, as illustrated at −15 inches Hg, mercury, which is the negative pressure supplied by source 48. During this transition, the liner moves as shown at 74, FIG. 5, to its open condition of FIG. 2 which is illustrated at 76 in FIG. 5. The duration of pressure transition 70, FIG. 4, varies greatly from one system to the next, but in this example is 0.2 second.

During the on portion of the pulsation cycle, the pressure in pulsation chamber 32 is at level 72, and the position of liner 24 is fully open as shown in FIG. 2, which is illustrated at 76 in FIG. 5. The duration of the on portion of the pulsation cycle varies greatly from one system to the next, but in this example is 0.4 second.

At the end of the on portion, pulsator valve 50 is switched back to its other position, to connect atmospheric connection tube 56 through valve 50 and connection tube 52 to pulsation chamber 32, such that the pressure in pulsation chamber 32 rises as shown at 78, FIG. 4, to level 64, and the cycle is repeated. During transition 78, the liner moves as shown at 80, FIG. 5, to its closed position at 68. The duration of pressure change transition 78 varies greatly from one system to the next, but in this example is 0.2 second. The duration of the off portion of the pulsation cycle at 64 varies greatly from one system to the next, but in this example is 0.1 second. A milking interval lasts about four to five minutes and is composed of a plurality of pulsation cycles, for instance about 250 to 350 cycles in the example given.

Present Invention

FIGS. 6–12 illustrate the present invention and use like reference numerals from FIGS. 1-5 where appropriate to facilitate understanding. The two-way valve or pulsator 50 of FIG. 1 is replaced by a variable pressure source 82 in FIG. 6, and controllably variable pressure is supplied to pulsation chamber 32. The variable pressure source is preferably a transducer, such as provided by a Bellofram Type 1000 Transducer Model 961-116-000, available from Bellofram Corporation, State Route 2, P.O. Box 305, Newell, W. Va. 26050. The transducer is connected between positive and negative pressure sources 84 and 48 at respective connection tubes 86 and 54, and supplies output pressure at connection tube 52 to pulsation chamber 32 of teat cup 12. The positive pressure port of the transducer is connected by connection tube 86 to positive pressure source 84. The vent port of the transducer is not connected to atmosphere, but instead is connected by connection tube 54 to negative pressure source 48 as a reference. The transducer controls the output pressure along a controllably variable pressure curve of selectable waveshape as set by controller or timer 88 providing a time dependent pattern, though other alternatives are possible, to be described.

A pulsation cycle is provided by applying a first pressure level 90, FIG. 7, from the variable pressure source to pulsation chamber 32 to open liner 24, FIG. 2, below teat 16 to provide an on portion of the pulsation cycle, and applying a second pressure level 92, higher than level 90, from the variable pressure source to pulsation chamber 32 to collapse and close liner 24, FIG. 3, below teat 16 to provide an off portion of the pulsation cycle. The pressure supplied to pulsation chamber 32 is controllingly varied during the transition 94 from the off portion 96 to the on portion 90 of the pulsation cycle, and during the transition 98 from the on portion 90 to the off portion 92 of the pulsation cycle. During these transitions, the rate of change of pressure supplied by the variable pressure source to pulsation chamber 32 is varied.

Figure 7:
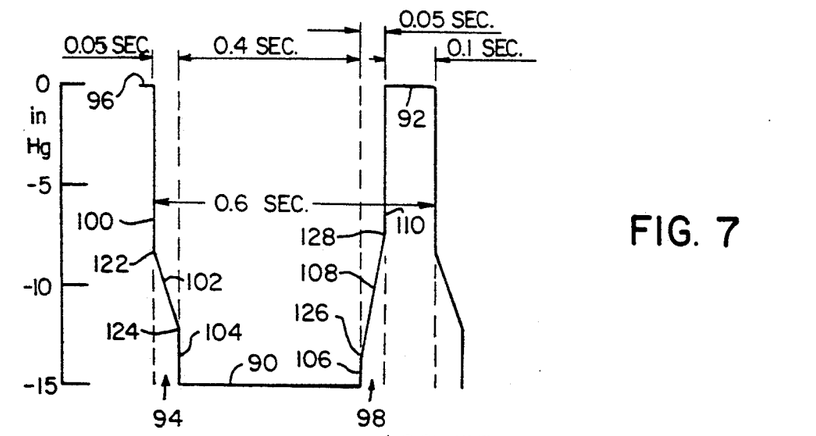
FIG. 7 is a graph showing pressure in the pulsation chamber during a pulsation cycle in accordance with the invention.

As shown during transition 94, FIG. 7, the pressure is abruptly changed at 100 at the beginning of the transition, and then varied at a slower rate of change at 102, and then abruptly changed at 104 at the end of the transition, such that there is a first abrupt pressure change 100 followed by a slower rate of pressure change 102 followed by a second abrupt pressure change 104, all during transition 94. Likewise during transition 98, there is a first abrupt pressure change 106 followed by a slower rate of pressure change 108 followed by a second abrupt pressure change 110, all during transition 98. During off portion 96 of the pulsation cycle, liner 24 is in its closed position of FIG. 3, as illustrated at 112 in FIG. 8. During transition 94, FIG. 7, the liner moves as shown at 114, FIG. 8, to its open position 116 during on portion 90 of the pulsation cycle. During transition 98, the liner moves as shown at 118 back to its closed position as shown at 120. Pressure levels 90 and 92 are alternately and repetitively applied to pulsation chamber 32 to provide a plurality of repetitive pulsation cycles, FIGS. 9 and 10, each cycle having an on portion during application of pressure level 90, and an off portion during application of pressure level 92. It is recognized that the instantaneous pressure changes 100, 104, 106, and 110 in FIG. 7 are idealized, and in fact some small amount of time elapses during these changes.

The pulsation cycle is shortened by shortening the transition time between pressure levels 90 and 92. In FIG. 7, the transition time of each of transitions 94 and 98 is 0.05 second, as compared to 0.2 second of FIG. 4. The shortened transition time in turn provides a shortened pulsation cycle time of 0.6 second in FIG. 7, as compared to 0.9 second in FIG. 4. The length of the on portion of the pulsation cycle is 0.4 second in each of FIGS. 7 and 4. The length of the off portion of the pulsation cycle is 0.1 second in each of FIGS. 7 and 4.

The transition time between pressure levels 90 and 92 is shortened by varying the rate of change of pressure applied to pulsation chamber 32 during the transition between on and off portions of the pulsation cycle. At least two different rates of change of pressure are provided during the transition, and pressure is applied to the pulsation chamber at each of such rates of change during the transition. It is preferred that the pressure be sequenced through changing pressure rates during the transition, including from a first rate such as 100 to a second rate such as 102, and from the second rate 102 to a third rate such as 104, all during transition 94. It is preferred that the first and third rates 100 and 104 be substantially instantaneous, and that the second rate 102 be substantially linear.

During the transition 94 from the off portion of the pulsation cycle at 96 to the on portion of the pulsation cycle at 90, the pressure applied to pulsation chamber 32 is abruptly decreased at 100, and then is decreased at 102 at a rate providing substantially constant rate of volume change within liner 24 as it opens at 114, and then the pressure is abruptly decreased at 104 to level 90. During the transition 98 from the on portion of the pulsation cycle at 90 to the off portion of the pulsation cycle at 92, the pressure is abruptly increased at 106, and then the pressure is increased at 108 at a rate providing a substantially constant rate of volume change within liner 24 as it closes at 118, and then the pressure is abruptly increased at 110 to upper level 92.

Figure 8:
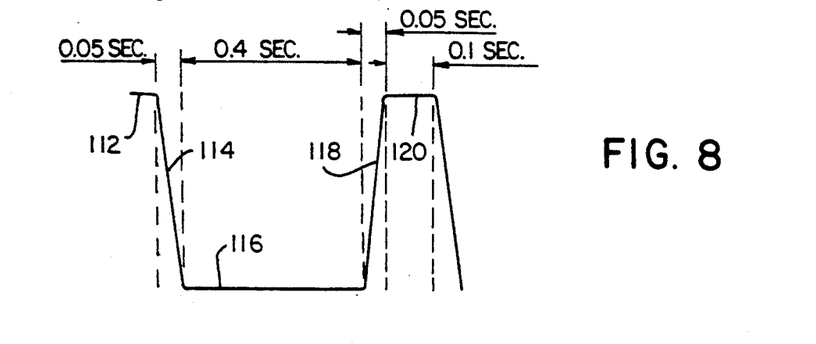
FIG. 8 shows liner movement during the pulsation cycle of FIG. 7.

The noted sequencing during transition 94 generates a linear change in internal liner volume at a maximum desired rate and reduces delays in liner movement by maintaining the pressure at upper level 96, FIG. 7, until it is desired to cause liner 24 to move, then abruptly changing the pressure to an intermediate level at 122 at which liner movement will begin as shown at 114, FIG. 8, then changing the pressure at a slower rate at 102 to an intermediate level at 124 to complete liner movement, and then abruptly changing the pressure at 104 to lower level 90. Likewise during transition 98, the sequencing generates a linear change in internal liner volume at a maximum desired rate and reduces delays in liner movement by maintaining the pressure at lower level 90 until it is desired to cause liner 24 to move, then abruptly changing the pressure to an intermediate level at 126 at which liner movement will begin, then changing the pressure at a slower rate at 108 to an intermediate level at 128 to complete liner movement at 118, and then abruptly changing the pressure at 110 to higher level 92. The sequencing and pressure change rates are preferably chosen such that the transition time between on and off portions of the pulsation cycle is limited only, or at least primarily, by the desired rate of movement of the liner between open and closed conditions, typically about 0.05 second, to in turn generate the maximum desired rate of movement of the liner. The transition points, 122, 124, 126, 128, FIG. 7, correspond to those pressure levels at which liner movement actually begins or ends. The efficiency of the waveform at FIG. 7 over that of FIG. 4 comes from the reduction in time wasted in the prior art waiting for the pressure to move from level 96 to 122, 124 to 90, 90 to 126, and 128 to 92, all of which used substantial time in the prior art.

Figure 9:
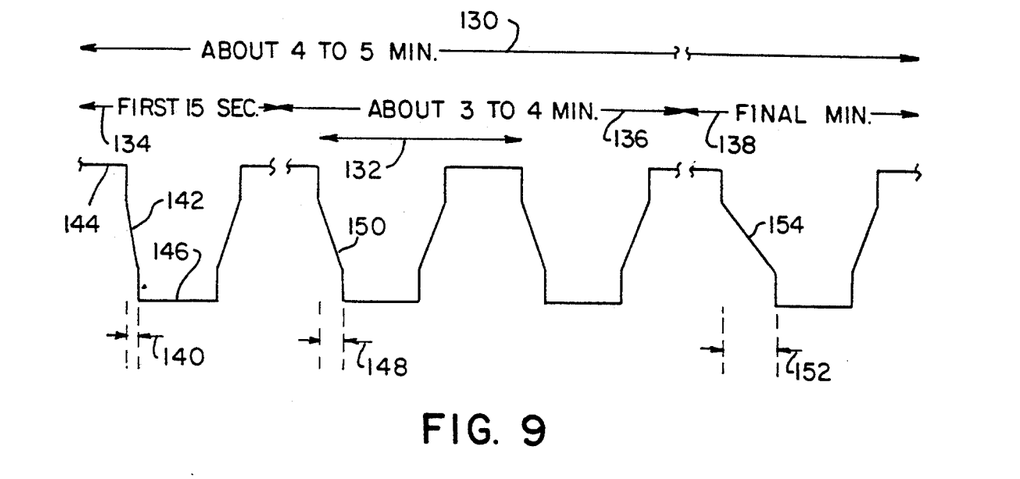
FIG. 9 shows a milking interval having a plurality of pulsation cycles.

A milking interval 130, FIG. 9, is composed of a plurality of pulsation cycles 132. As noted above, the length of each pulsation cycle is about 0.6 second. The length of milking interval 130 is typically about four to five minutes, though may be shorter or longer depending on when milk flow rate decreases below a given level, and the amount of milk to be removed.

The milking interval 130, FIG. 9, may simply consist of repetition of cycles such as 132, or the individual cycles may be varied as milking progresses. One example of this, also shown in FIG. 9, utilizes the fact, previously known in the art, that rapid opening of the liner tends to decrease friction between liner and teat. This is desirable at the start of milking because it enhances penetration of the teat into the liner. Near the end point of milking, however, pressure of milk inside the teat is reduced, reducing friction between teat and liner, and in this condition, opening the liner more slowly is beneficial. The present invention allows utilization of this knowledge by opening the liner rapidly at the beginning of milking, but slowly at the end of milking. Milking interval 130 has a first or initial sub-interval 134, for example lasting for about the first fifteen seconds, a second or main sub-interval 136, for example lasting about three to four minutes, and a third or final sub-interval 138, for example lasting about a minute. In the cycles during initial sub-interval 134, the decreasing-pressure transition time is shown at 140. The pressure decreases at 142 from upper pressure level 144 to lower pressure level 146. In the cycles during main sub-interval 136, the decreasing-pressure transition time is shown at 148. The pressure decreases at 150 from the upper pressure level 144 to the lower pressure level 146. Transition time 148 is the same as the transition time for transition 94 in FIG. 7. In the cycles during the final sub-interval 138, the decreasing-pressure transition time is shown at 152. The pressure decreases at 154 from the upper pressure level 144 to the lower pressure level 146. Transition time 140 is less than transition time 148. Transition time 152 is greater than transition time 148.

The pressure change transition time 152, FIG. 9, from the upper pressure level to the lower pressure level during pulsation cycles at the end of the milking interval is lengthened to provide a decreasing-pressure transition time 152 during pulsation cycles at the end of the milking interval which is longer than the decreasing-pressure transition time 148 during pulsation cycles in the middle of the milking interval, to provide a slower rate of liner opening movement during pulsation cycles at the end of the milking interval than the rate of liner opening movement during pulsation cycles in the middle of the milking interval, to open the liner more slowly at the end of the milking interval than during the middle of the milking interval, to limit loss of adhesion between a less than full teat and the interior of the liner at the end of the milking interval. Pressure change transition time 140 from the upper pressure level to the lower pressure level during pulsation cycles at the beginning of the milking interval is shortened to provide a decreasing-pressure transition time 140 during pulsation cycles at the beginning of the milking interval which is shorter than the decreasing-pressure transition time 148 during pulsation cycles in the middle of the milking interval, to provide a faster rate of liner opening movement during pulsation cycles at the beginning of the milking interval than the rate of liner opening movement during pulsation cycles in the middle of the milking interval, to open the liner more rapidly at the beginning of the milking interval than during the middle of the milking interval, to provide deeper teat penetration into the liner and faster milking. The pressure applied to the pulsation chamber is varied during the decreasing pressure portions of the pulsation cycles to open the liner at a first rate of liner opening movement corresponding to pressure change rate 142 during pulsation cycles at the beginning of the milking interval, a second rate of liner opening movement corresponding to pressure change rate 150 during pulsation cycles in the middle of the milking interval, and a third rate of liner opening movement corresponding to pressure change rate 154 during pulsation cycles at the end of the milking interval. Rate 142 is faster than rate 150 Rate 154 is slower than rate 150.

Figure 10:
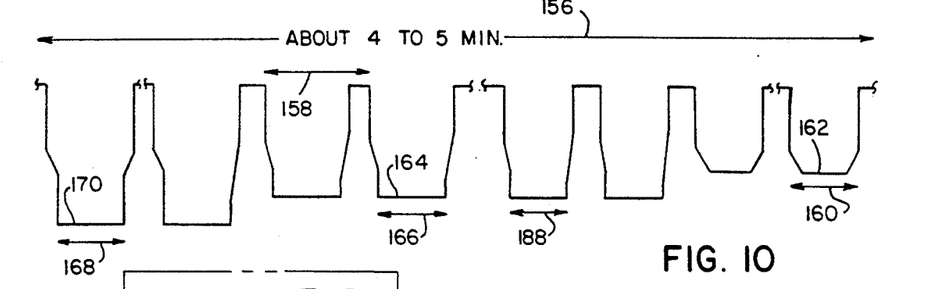
FIG. 10 shows a milking interval having a plurality of pulsation cycles, and shows a further embodiment.
Figure 11:
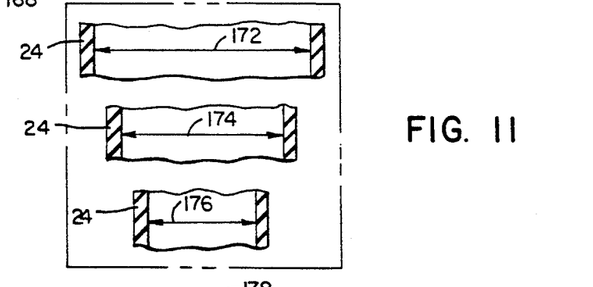
FIG. 11 shows differing liner diameters during the milking interval of FIG. 10.

In a further embodiment, FIG. 10. a milking interval 156 is composed of a plurality of pulsation cycles 158. As noted above, the length of each pulsation cycle 158 is about 0.6 second. The length of milking interval 156 is typically about four to five minutes, through may be shorter or longer depending on when milking flow rate decreases below a given level. During on portions such as 160 of pulsation cycles at the end of milking interval 156, the pressure applied to pulsation chamber 32 is varied to provide a higher pressure level 162 than the pressure level such as 164 during on portions of pulsation cycles such as 166 during the middle of milking interval 156, such that liner 24 opens less at the end of milking interval 156 than during the middle of milking interval 156, to limit loss of adhesion between a less than full teat and the interior of liner 24 at the end of milking interval 156. During on portions such as 168 of pulsation cycles at the beginning of milking interval 156, the pressure applied to pulsation chamber 32 is varied to a lower pressure level 170 than pressure level 164 during on portion 166 of pulsation cycles during the middle of milking interval 156, to open liner 24 more at the beginning of milking interval 156 than during the middle of milking interval 156, to provide deeper teat penetration into liner 24 and faster milking. Pressure level 170 opens liner 24 to diameter 172, FIG. 11, at the beginning of milking interval 156. Pressure level 164 opens liner 24 to diameter 174 during the middle of milking interval 156. Pressure level 162 opens liner 24 to diameter 176 at the end of milking interval 156. Diameter 172 is greater than diameter 174. Diameter 174 is greater than diameter 176.

Figure 12:
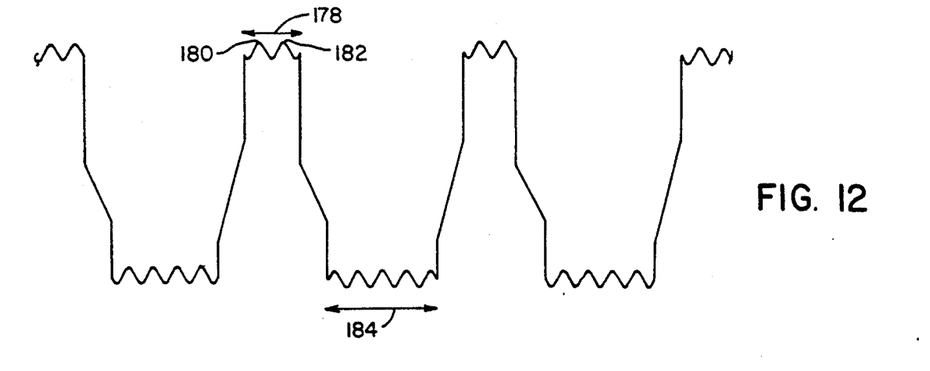
FIG. 12 is like FIG. 7 and shows a further embodiment.

In a further embodiment, the pressure applied to pulsation chamber 32 is varied during the off portion 178, FIG. 12, of the pulsation cycle, including increasing the pressure, as at 180, 182, applied to the pulsation chamber during the off portion of the pulsation cycle to increase the massage force of liner 24 on teat 16. The teat is vibrated and massaged during off portion 178 of the pulsation cycle by alternately increasing and decreasing the pressure applied to pulsation chamber 32 during off portion 178 at a higher frequency than the repetition frequency of the pulsation cycle. The pressure applied to pulsation chamber 32 is also varied during the on portion 184, FIG. 12, of the pulsation cycle by alternately increasing and decreasing the pressure at a higher frequency than the repetition frequency of the pulsation cycle to bump and vibrate teat 16 and further stimulate the milk ejection reflex of the mammal.

It will be recognized that the present invention includes the possibility of synthesizing any number of waveforms of individual pulsation cycles, as well as the possibility of any number of modifications of those waveforms as milking progresses. The invention is not limited to the above described types of pulsation cycles and sequences of cycles. It is anticipated that those using this invention will develop further cycles and sequences of cycles, the practice of which is made possible by this invention.

Figure 6:
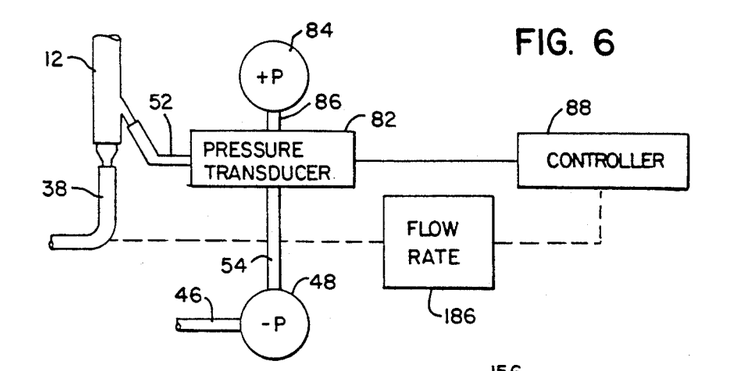
FIG. 6 shows a milking system in accordance with the present invention.

It is further recognized that the transducer, 82 in FIG. 6, is actually a non-ideal device and therefore its output may not exactly follow the input electrical signal. The present invention permits partially correcting for this non-ideal characteristic by incorporating a feedback signal from the transducer output to modify its input, or more simply by overdriving the transducer to increase the rate of change of output pressure that can be achieved.

It is further recognized that the thin liner disclosed in commonly owned co-pending U.S. application Ser. No. 07/714,491, filed Jun. 13, 1991, is ideally suited to control by the pulsation system of this invention. The thin liner transmits pulsation chamber pressure to the teat with little distortion caused by the stiffness of the liner wall. Therefore the electrical signal to the transducer may be a direct representation of the pressure waveform desired to be imposed upon the teat.

Controller 88 is preferably provided by a Compaq computer programmed by the "Asystant +" program by MacMillan Software Company and interfaced to the Bellofram Type 1000 transducer through an AD694 current transmitter available from Analog Devices, One Technology Way, P.O. Box 9106, Norwood, Me. 02062-9106 Alternatively or in addition to timed waveform control of the pressure transducer, the pressure may be varied according to milk flow rate as monitored by sensor 186, which may be provided as disclosed in "Monitoring The Flow Of Milk Within Machine Milked Teat By Observing Doppler Shift Of Back-Scattered Ultrasound", P. Thompson and L. Campbell, Transactions of the ASAE, American Society of Agricultural Engineers, Vol. 17, No. 3, pp. 496, 497, 498, 499, and 504, 1974. For example, in addition to acting as a timer, controller 88 also responds to reduced milk flow rate as indicated by sensor 186, and shortens the duration of the on portion of the pulsation cycle, by terminating the on portion and initiating the off portion of the pulsation cycle. For example, the duration of an on portion 188, FIG. 10, of a pulsation cycle occurring later in a milking interval may be shorter than the duration of an on portion 166 of a pulsation cycle occurring earlier in the milking interval. This further reduces milking time and the length of the milking interval by eliminating nonefficient segments of on portions of the pulsation cycles, and keeping the liner open only as long as there is sufficient milk flow to justify same. When milk flow rate drops below a given level. the liner is closed and a new pulsation cycle is initiated.

Because of the anatomical structure of the teat, milk will not flow at a steady rate during the time that the liner is open. Rather, milk will flow at a relatively constant rate beginning when the liner first opens, but this rate will decline. The reason for the decline is the swelling of the tissue surrounding the teat canal as a reaction to the application of milking vacuum, i.e. the negative pressure in milk flow passage 28. The collapse of the liner around the teat during the off portion of the pulsation cycle removes physiological fluids from the teat end, reducing its swelling. and enabling the resumption of higher rate milk flow when the on portion of the next pulsation cycle begins. With a conventional two-way valve or pulsator 50, the transitions between off and on portions of the pulsation cycle begin at a high rate of pressure change, but the rate of pressure change decreases as the pressure approaches the next level. This reduction is because the rate of air flow through the ports of the conventional pulsator is dependent upon the pressure difference across the open port. The timebase scaling factor of these transitions is adjusted by selecting an appropriate port size, with the goal being to achieve a rapid transition without exceeding the limit imposed by the ability of milk tube 38 to accommodate the air flow which moves into or out of the liner as it opens or closes. The result of this constraint is that the transition of pulsation pressure from level 62, FIG. 4, to level 72, takes 0.2 second, even though the liner actually moves from its closed position 66, FIG. 5, to its open position 76 in less time. In contrast, by providing a variable pressure source and supplying controllably variable pressure to the pulsation chamber, including during the noted transitions, the shape of the transition pressure waveform can be entirely different. In the liner opening phase, the pressure falls until the liner is just ready to begin opening. This stage of falling pressure can be very abrupt, because it is not accompanied by movement of the liner. Next, pressure continues to fall along a curve such as 102, FIG. 7, which gives constant rate of volume change within the liner as it shifts from the closed to the open position. Finally, the pressure can again abruptly shift to milking vacuum, i.e. negative pressure level 90, FIG. 7. These stages are reversed as the liner closes again in response to the transition from the on to the off portion of the pulsation cycle. A fixed port pulsator such as 50 does not permit the transition slope to be modified or otherwise shaped as desired. On-off cycle times, and upper and lower limits of pulsation, can be varied with a two-way valve, but transitional slopes cannot be changed or shaped or otherwise controlled unless the fixed port size is changed.

The timing pattern provided by controller 88 and/or the flow rate provided by sensor 186 may vary the repetition rate of the pressure curve waveshape, to provide a plurality of pulsation cycles of variable duration during the milking interval, or may vary the pressure levels. As a further alternative to a pressure transducer, the variable pressure source can be provided by various combinations of two-position valves connected to synthesize a desirable waveshape, particularly the slope providing the desired rates of change during the noted transitions. As a further alternative, the variable pressure source is provided by a pressure source and a valve with a variable orifice.

It is recognized that various equivalents, alternatives and modifications are possible within the scope of the appended claims.

We claim:

1. In a method for milking a mammal, comprising providing a teat cup having a liner around a teat of the mammal and defining a milk flow passage within said liner and a pulsation chamber between said liner and said teat cup, providing a negative pressure source and applying negative pressure to said milk flow passage, providing a two-way valve and alternating said two way valve between a first condition connecting said negative pressure source to said pulsation chamber and a second condition supplying atmospheric or higher pressure to said pulsation chamber, said valve providing a pulsation cycle having an on portion during said first condition of said valve and an off portion during said second condition of said valve, the improved method comprising replacing said two-way valve with a variable pressure source and supplying controllably variable pressure to said pulsation chamber.

2. The method according to claim 1 comprising varying the pressure supplied to said pulsation chamber along a controllably variable pressure curve of selectable waveshape.

3. The method according to claim 1 comprising providing a pulsation cycle by applying a first pressure level from said variable pressure source to said pulsation chamber to open said liner below the teat and provide an on portion of said pulsation cycle, and applying a second pressure level, higher than said first pressure level, from said variable pressure source to said pulsation chamber to collapse and close said liner below the teat and provide an off portion of said pulsation cycle, and comprising controllingly varying the pressure supplied to said pulsation chamber from said variable pressure source during the transition from at least one of said on and off portions of said pulsation cycle to the other of said on and off portions of said pulsation cycle.

4. The method according to claim 3 comprising varying the rate of change of pressure supplied by said variable pressure source to said pulsation chamber during said transition.

5. The method according to claim 4 comprising abruptly changing the pressure at the beginning of said transition, and then varying the pressure at a slower rate of change, all during said transition.

6. The method according to claim 5 comprising abruptly changing the pressure at the end of said transition following said slower rate of pressure change, such that said variable pressure source provides a first abrupt pressure change followed by a slower rate of pressure change followed by a second abrupt pressure change, all during said transition.

7. The method according to claim 3 comprising abruptly changing the pressure applied to said pulsation chamber by said variable pressure source at a rate sufficiently fast that the transition time between said on and off portions of said pulsation cycle is limited only by the desired rate of movement of said liner between open and closed conditions.

8. The method according to claim 3 comprising changing the pressure applied to said pulsation chamber by said variable pressure source at a rate generating the maximum desired rate of movement of said liner.

9. The method according to claim 1 comprising providing a pulsation cycle by applying a first pressure level from said variable pressure source to said pulsation chamber to open said liner below the teat and provide an on portion of said pulsation cycle, and applying a second pressure level, higher than said first pressure level, from said variable pressure source to said pulsation chamber to collapse and close said liner below the teat and provide an off portion of said pulsation cycle, and comprising alternately increasing and decreasing the pressure applied to said pulsation chamber by said variable pressure source during said off portion of said pulsation cycle at a higher frequency than the repetition frequency of said pulsation cycle.

10. The method according to claim 1 comprising providing a pulsation cycle by applying a first pressure level from said variable pressure source to said pulsation chamber to open said liner below the teat and provide an on portion of said pulsation cycle, and applying a second pressure level, higher than said first pressure level, from said variable pressure source to said pulsation chamber to collapse and close said liner below the teat and provide an off portion of said pulsation cycle, and comprising alternately increasing and decreasing the pressure applied to said pulsation chamber by said variable pressure source during said on portion of said pulsation cycle at a higher frequency than the repetition frequency of said pulsation cycle.

11. The method according to claim 1 comprising providing a pulsation cycle by applying a first pressure level from said variable pressure source to said pulsation chamber to open said liner below the teat and provide an on portion of said pulsation cycle, and applying a second pressure level, higher than said first pressure level, from said variable pressure source to said pulsation chamber to collapse and close said liner below the teat and provide an off portion of said pulsation cycle, providing a milking interval having a plurality of said pulsation cycles, lengthening the pressure change transition time from said second level to said first level during pulsation cycles at the end of said milking interval to provide a decreasing-pressure transition time during pulsation cycles at the end of said milking interval which is longer than the decreasing-pressure transition time during pulsation cycles in the middle of said milking interval, to provide a slower rate of liner opening movement during pulsation cycles at the end of said milking interval than the rate of liner opening movement during pulsation cycles in the middle of said milking interval, to open said liner more slowly at the end of said milking interval than during the middle of said milking interval, to limit loss of adhesion between a less than full teat and the interior of said liner at the end of said milking interval.

12. The method according to claim 1 comprising providing a pulsation cycle by applying a first pressure level from said variable pressure source to said pulsation chamber to open said liner below the teat and provide an on portion of said pulsation cycle, and applying a second pressure level, higher than said first pressure level, from said variable pressure source to said pulsation chamber to collapse and close said liner below the teat and provide an off portion of said pulsation cycle, providing a milking interval having a plurality of said pulsation cycles, shortening the pressure change transition time from said second level to said first level during pulsation cycles at the beginning of said milking interval to provide a decreasing-pressure transition time during pulsation cycles at the beginning of said milking interval which is shorter than the decreasing-pressure transition time during pulsation cycles in the middle of said milking interval, to provide a faster rate of liner opening movement during pulsation cycles at the beginning of said milking interval than the rate of liner opening movement during pulsation cycles in the middle of said milking interval, to open said liner more rapidly at the beginning of said milking interval than during the middle of said milking interval, to provide deeper teat penetration into the liner.

13. The method according to claim 1 comprising providing a pulsation cycle by applying a first pressure level from said variable pressure source to said pulsation chamber to open said liner below the teat and provide an on portion of said pulsation cycle, and applying a second pressure level, higher than said first pressure level, from said variable pressure source to said pulsation chamber to collapse and close said liner below the teat and provide an off portion of said pulsation cycle, providing a milking interval having a plurality of said pulsation cycles, varying the pressure change transition time from said second level to said first level and providing a first decreasing-pressure transition time from said second level to said first level during pulsation cycles at the beginning of said milking interval, a second decreasing-pressure transition time from said second level to said first level during pulsation cycles in the middle of said milking interval, and a third decreasing-pressure transition time from said second level to said first level during pulsation cycles at the end of said milking interval, wherein said first transition time is less than said second transition time, and said third transition time is greater than said second transition time.

14. The method according to claim 1 comprising providing a pulsation cycle by applying a first pressure level from said variable pressure source to said pulsation chamber to open said liner below the teat and provide an on portion of said pulsation cycle, and applying a second pressure level, higher than said first pressure level, from said variable pressure source to said pulsation chamber to collapse and close said liner below the teat and provide an off portion of said pulsation cycle, providing a milking interval having a plurality of said pulsation cycles, varying the pressure applied to said pulsation chamber by said variable pressure source during on portions of pulsation cycles at the end of said milking interval to open said liner less at the end of said milking interval than during the middle of said milking interval, to limit loss of adhesion between a less than full teat and the interior of said liner at the end of said milking interval.

15. The method according to claim 1 comprising providing a pulsation cycle by applying a first pressure level from said variable pressure source to said pulsation chamber to open said liner below the teat and provide an on portion of said pulsation cycle, and applying a second pressure level, higher than said first pressure level, from said variable pressure source to said pulsation chamber to collapse and close said liner below the teat and provide an off portion of said pulsation cycle, providing a milking interval having a plurality of said pulsation cycles, varying the pressure applied to said pulsation chamber by said variable pressure source during on portions of pulsation cycles at the beginning of said milking interval to open said liner more at the beginning of said milking interval than during the middle of said milking interval, to provide deeper teat penetration into the liner.

16. The method according to claim 1 comprising providing a pulsation cycle by applying a first pressure level from said variable pressure source to said pulsation chamber to open said liner below the teat and provide an on portion of said pulsation cycle, and applying a second pressure level, higher than said first pressure level, from said variable pressure source to said pulsation chamber to collapse and close said liner below the teat and provide an off portion of said pulsation cycle, providing a milking interval having a plurality of said pulsation cycles, varying the pressure applied to said pulsation chamber by said variable pressure source during on portions of pulsation cycles during said milking interval to open said liner to a first diameter at the beginning of said milking interval, and to a second diameter during the middle of said milking interval, and to a third diameter at the end of said milking interval, said first diameter being greater than said second diameter, and said second diameter being greater than said third diameter.

17. The method according to claim 1 comprising providing a pulsation cycle by applying a first pressure level from said variable pressure source to said pulsation chamber to open said liner below the teat and provide an on portion of said pulsation cycle, and applying a second pressure level, higher than said first pressure level, from said variable pressure source to said pulsation chamber to collapse and close said liner below the teat and provide an off portion of said pulsation cycle, terminating said on portion of said pulsation cycle and initiating said off portion of said pulsation cycle in response to a designated decrease in milk flow rate.

18. The method according to claim 1 comprising repetitively varying the pressure supplied to said pulsation chamber by repeating a pressure curve of selectable waveshape, and controllably varying the repetition rate to provide a plurality of cycles of variable duration.

19. The method according to claim 18 comprising varying said waveshape from cycle to cycle.

20. The method according to claim 1 comprising varying the pressure supplied by said variable pressure source to said pulsation chamber in response to a given parameter.

21. The method according to claim 20 wherein said given parameter is time.

22. The method according to claim 20 wherein said given parameter is milk flow rate.

23. A method for milking a mammal, comprising:
providing a teat cup having a liner around a teat of the mammal and defining a milk flow passage within said liner and a pulsation chamber between said liner and said teat cup;
applying negative pressure below atmospheric pressure to said milk flow passage;
applying a first pressure level to said pulsation chamber to open said liner below the teat;
applying a second pressure level, higher than said first pressure level, to said pulsation chamber to collapse and close said liner below the teat;
alternately and repetitively applying said first and second pressure levels to said pulsation chamber to provide a plurality of repetitive pulsation cycles, each cycle having an on portion during application of said first pressure level, and an off portion during application of said second pressure level;
controllingly varying the pressure applied to said pulsation chamber during the transition from at least one of said on and off portions of said pulsation cycle to the other of said on and off portions of said pulsation cycle.

24. The method according to claim 23 comprising varying the pressure applied to said pulsation chamber during said transition in response to a given parameter.

25. The method according to claim 24 wherein said given parameter is time.

26. The method according to claim 24 wherein said given parameter is milk flow rate.

27. A method for milking a mammal, comprising:
providing a teat cup having a liner around a teat of the mammal and defining a milk flow passage within said liner and a pulsation chamber between said liner and said teat cup;
applying negative pressure below atmospheric pressure to said milk flow passage;
applying a first pressure level to said pulsation chamber to open said liner below the teat;
applying a second pressure level, higher than said first pressure level, to said pulsation chamber to collapse and close said liner below the teat;
alternately and repetitively applying said first and second pressure levels to said pulsation chamber to provide a plurality of repetitive pulsation cycles, each cycle having an on portion during application of said first pressure level, and an off portion during application of said second pressure level;
shortening said pulsation cycle by shortening the transition time from at least one of said first and second pressure levels to the other of said first and second pressure levels by varying the rate of change of pressure applied to said pulsation chamber during the transition from at least one of said on and off portions to the other of said on and off portions.

28. The method according to claim 27 comprising, during said transition, providing at least two different rates of change of pressure, and applying pressure to said pulsation chamber at each of said rates of change during said transition.

29. The method according to claim 28 comprising, during said transition, initially applying pressure to said pulsation chamber at a first rate of change, and then applying pressure to said pulsation chamber at a second rate of change which is less than said first rate of change, such that two different rates of change of pressure are applied to said pulsation chamber during said transition.

30. The method according to claim 29 comprising, during said transition and following said application of pressure at said second rate of change, applying pressure to said pulsation chamber at a third rate of change which is greater than said second rate of change, such that during said transition, said pulsation chamber is sequenced through changing pressure rates, including from said first rate to said second rate, and from said second rate to said third rate, all during said transition.

31. The method according to claim 30 wherein said first and third rates are substantially instantaneous.

32. The method according to claim 27 comprising, during the transition from said off portion to said on portion of said pulsation cycle, abruptly decreasing the pressure applied to said pulsation chamber, then decreasing the pressure at a rate providing substantially constant rate of volume change within said liner as it opens, and then abruptly decreasing the pressure to said first level.

33. The method according to claim 27 comprising, during the transition from said on portion to said off portion of said pulsation cycle, abruptly increasing the pressure applied to said pulsation chamber, then increasing the pressure at a rate providing a substantially constant rate of volume change within said liner as it closes, and then abruptly increasing the pressure to said second level.

34. The method according to claim 27 comprising shortening said pulsation cycle by shortening the transition time from said second pressure level to said first pressure level and by shortening the transition time from said first pressure level to said second pressure level, by varying the rate of pressure change during the transition from said off portion to said on portion and by varying the rate of pressure change during the transition from said on portion to said off portion.

35. A method for milking a mammal, comprising:
providing a teat cup having a liner around a teat of the mammal and defining a milk flow passage within said liner and a pulsation chamber between said liner and said teat cup;
applying negative pressure below atmospheric pressure to said milk flow passage;
applying a first pressure level to said pulsation chamber to open said liner below the teat;
applying a second pressure level, higher than said first pressure level, to said pulsation chamber to collapse and close said liner below the teat;
alternately and repetitively applying said first and second pressure levels to said pulsation chamber to provide a plurality of repetitive pulsation cycles, each cycle having an on portion during application of said first pressure level, and an off portion during application of said second pressure level;
during the transition from one of said on and off portions to the other of said on and off portions, controllingly varying the pressure applied to said pulsation chamber at a rate which generates a linear change in internal liner volume at a maximum desired rate and reducing delays in liner movement, comprising maintaining the pressure at one of said first and second levels until it is desired to move said liner, then abruptly changing the pressure to an intermediate level to begin liner movement, then changing the pressure at a slower rate to complete liner movement, then abruptly changing the pressure to the other of said first and second levels.

36. The method according to claim 35 comprising, during the transition from said off to said on portion, maintaining the pressure at said second level until it is desired to open said liner, then abruptly decreasing the pressure to an intermediate level to begin liner opening movement, then decreasing the pressure at a rate generating the maximum desired rate of movement of said liner to complete liner opening movement, then abruptly decreasing the pressure to said first level.

37. The method according to claim 35 comprising, during the transition from said on to said off portion, maintaining the pressure at said first level until it is desired to close said liner, then abruptly increasing the pressure to an intermediate level to begin liner closing movement, then increasing the pressure at a rate generating the maximum desired rate of movement of said liner to complete liner closing movement, then abruptly increasing the pressure to said second level.

38. The method according to claim 35 comprising:
during the transition from said of to said on portion, maintaining the pressure at said second level until it is desired to open said liner, then abruptly decreasing the pressure to an intermediate level to begin liner opening movement, then decreasing the pressure at a rate generating the maximum desired rate of movement of said liner to complete liner opening movement, then abruptly decreasing the pressure to said first level;
during the transition from said on to said off portion, maintaining the pressure at said first level until it is desired to close said liner, then abruptly increasing the pressure to an intermediate level to begin liner closing movement, then increasing the pressure at a rate generating the maximum desired rate of movement of said liner to complete liner closing movement, then abruptly increasing the pressure to said second level.

39. A method for milking a mammal, comprising:
providing a teat cup having a liner around a teat of the mammal and defining a milk flow passage within said liner and a pulsation chamber between said liner and said teat cup;
applying negative pressure below atmospheric pressure to said milk flow passage;
applying a first pressure level to said pulsation chamber to open said liner below the teat;
applying a second pressure level, higher than said first pressure level, to said pulsation chamber to collapse and close said liner below the teat;
alternately and repetitively applying said first and second pressure levels to said pulsation chamber to provide a plurality of repetitive pulsation cycles, each cycle having an on portion during application of said first pressure level, and an off portion during application of said second pressure level;
controllingly varying the pressure applied to said pulsation chamber during said off portion of said pulsation cycle, including increasing the pressure applied to said pulsation chamber during said off portion of said pulsation cycle to increase the massage force of said liner on the teat.

40. The method according to claim 39 comprising vibrating and massaging the teat during said off portion of said pulsation cycle by alternately increasing and decreasing the pressure applied to said pulsation chamber during said off portion at a frequency higher than the repetition frequency of said pulsation cycle.

41. A method for milking a mammal, comprising:
providing a teat cup having a liner around a teat of the mammal and defining a milk flow passage within said liner and a pulsation chamber between said liner and said teat cup;
applying negative pressure below atmospheric pressure to said milk flow passage;
applying a first pressure level to said pulsation chamber to open said liner below the teat;
applying a second pressure level, higher than said first pressure level, to said pulsation chamber to collapse and close said liner below the teat;
alternately and repetitively applying said first and second pressure levels to said pulsation chamber to provide a plurality of repetitive pulsation cycles, each cycle having an on portion during application of said first pressure level, and an off portion during application of said second pressure level; controllingly varying the pressure applied to said pulsation chamber during said on portion of said pulsation cycle.

42. The method according to claim 41 comprising alternately increasing and decreasing the pressure applied to said pulsation chamber during said on portion of said pulsation cycle at a frequency higher than the repetition frequency of said pulsation cycle to bump and vibrate the teat and further stimulate the milk ejection reflex of the mammal.

43. The method according to claim 41 comprising providing a milking interval having a plurality of said pulsation cycles, and varying the pressure applied to said pulsation chamber during decreasing pressure portions of pulsation cycles at the end of said milking interval to open said liner more slowly at the end of said milking interval than during the middle of said milking interval, to limit loss of adhesion between a less than full teat and the interior of the liner at the end of said milking interval.

44. The method according to claim 41 comprising providing a milking interval having a plurality of said pulsation cycles, and varying the pressure applied to said pulsation chamber during decreasing pressure portions of pulsation cycles at the beginning of said milking interval to open said liner more rapidly at the beginning of said milking interval than during the middle of said milking interval, to provide deeper teat penetration into the liner.

45. The method according to claim 41 comprising providing a milking interval having a plurality of said pulsation cycles, and varying the pressure applied to said pulsation chamber during decreasing pressure portions of pulsation cycles during said milking interval to open said liner at a first rate of liner opening movement during pulsation cycles at the beginning of said milking interval, a second rate of liner opening movement during pulsation cycles in the middle of said milking interval, and a third rate of liner opening movement during pulsation cycles at the end of said milking interval, wherein said first rate is faster than said second rate, and said third rate is slower than said second rate.

46. The method according to claim 41 comprising providing a milking interval having a plurality of said pulsation cycles, and varying the pressure applied to said pulsation chamber during decreasing pressure portions of pulsation cycles at the end of said milking interval to open said liner less at the end of said milking interval than during the middle of said milking interval, to limit loss of adhesion between a less than full teat and the interior of the liner at the end of said milking interval.

47. The method according to claim 41 comprising providing a milking interval having a plurality of said pulsation cycles, and varying the pressure applied to said pulsation chamber during decreasing pressure portions of pulsation cycles at the beginning of said milking interval to open said liner more at the beginning of said milking interval than during the middle of said milking interval, to provide deeper teat penetration into the liner.

48. The method according to claim 41 comprising providing a milking interval having a plurality of said pulsation cycles, and varying the pressure applied to said pulsation chamber during decreasing pressure portions of pulsation cycles during said milking interval to open said liner to a first diameter at the beginning of said milking interval, and to a second diameter during the middle of said milking interval, and to a third diameter at the end of said milking interval, said first diameter being greater than said second diameter, and said second diameter being greater than said third diameter.

49. In milking apparatus for milking a mammal, including a teat cup having a liner around a teat of the mammal and defining a milk flow passage within said liner and a pulsation chamber between said liner and said teat cup, a negative pressure source applying negative pressure to said milk flow passage, the improvement comprising a variable pressure source supplying controllably variable pressure to said pulsation chamber and providing a pulsation cycle by applying a first pressure level to said pulsation chamber to open said liner below the teat to provide an on portion of the pulsation cycle, and applying a second pressure level, higher than said first pressure level, to said pulsation chamber to collapse and close said liner below the teat to provide an off portion of the pulsation cycle.

50. The apparatus according to claim 49 wherein said variable pressure source varies the pressure supplied to said pulsation chamber along a controllably variable pressure curve of selectable waveshape.

51. The apparatus according to claim 49 wherein said variable pressure source varies the rate of pressure change during the transition from at least one of said on and off portions of said pulsation cycle to the other of said on and off portions of said pulsation cycle.

52. The apparatus according to claim 51 wherein said variable pressure source provides an abrupt pressure change at the beginning of said transition, followed by a slower rate of pressure change.

53. The apparatus according to claim 52 wherein said variable pressure source provides another abrupt pressure change at the end of said transition following said slower rate of pressure change, such that said variable pressure source provides a first abrupt pressure change followed by a slower rate of pressure change followed by a second abrupt pressure change, all during said transition.

54. The apparatus according to claim 49 wherein said variable pressure source abruptly changes the pressure applied to said pulsation chamber at a rate sufficiently fast that the transition time between said on and off portions of said pulsation cycle is limited primarily by the desired rate of movement of said liner between open and closed conditions.

55. The apparatus according to claim 49 wherein said variable pressure source repetitively varies the pressure supplied to said pulsation chamber by repeating a pressure curve of selectable waveshape at a controllably variable repetition rate, to provide a plurality of cycles of variable duration.

56. The apparatus according to claim 55 wherein said waveshape is variable from cycle to cycle.

57. The apparatus according to claim 49 wherein said variable pressure source supplies pressure to said pulsation chamber in response to a given parameter.

58. The apparatus according to claim 57 wherein said given parameter is time.

59. The apparatus according to claim 57 wherein said given parameter is milk flow rate.

60. The apparatus according to claim 49 wherein said variable pressure source comprises a pressure transducer.

* * * * *